United States Patent
Das et al.

(10) Patent No.: US 9,590,853 B1
(45) Date of Patent: *Mar. 7, 2017

(54) CONFIGURATION OF APPLICATIONS FOR DISTRIBUTED COMPUTING SYSTEMS

(71) Applicant: Juniper Networks, Inc., Sunnyvale, CA (US)

(72) Inventors: Ranadip Das, Fremont, CA (US); Bruno Rijsman, Arlington, MA (US); Ranjini Rajendran, Bangalore (IN); Subbu Subramaniam, Sunnyvale, CA (US); Kallol Banerjee, San Jose, CA (US); Vineet Goel, La Jolla, CA (US); Nathaniel H Ingersoll, Nevada City, NV (US); Sunil Bakhru, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/697,435

(22) Filed: Apr. 27, 2015

Related U.S. Application Data

(63) Continuation of application No. 13/538,956, filed on Jun. 29, 2012, now Pat. No. 9,021,010.

(51) Int. Cl.
| | |
|---|---|
| *G06F 15/16* | (2006.01) |
| *G06F 15/173* | (2006.01) |
| *H04L 12/24* | (2006.01) |
| *H04L 29/08* | (2006.01) |

(52) U.S. Cl.
CPC ...... *H04L 41/0846* (2013.01); *H04L 41/0813* (2013.01); *H04L 67/1097* (2013.01)

(58) Field of Classification Search
CPC ..... H04L 67/10; H04L 41/0803; H04L 41/08; H04L 41/0823
USPC ....... 709/201, 202, 203, 217, 218, 219, 220, 709/221, 222, 245, 250
See application file for complete search history.

(56) References Cited

U.S. PATENT DOCUMENTS

| | | | |
|---|---|---|---|
| 6,560,655 B1 * | 5/2003 | Grambihler | H04L 69/329 709/202 |
| 7,225,244 B2 * | 5/2007 | Reynolds | G06F 1/14 709/203 |
| 7,865,578 B1 | 1/2011 | Gerraty | |

(Continued)

OTHER PUBLICATIONS

Prosecution History from U.S. Appl. No. 13/538,956, dated Jan. 6, 2014 through Feb. 10, 2015, 65 pp.

*Primary Examiner* — Edward Kim
(74) *Attorney, Agent, or Firm* — Shumaker & Sieffert, P.A.

(57) ABSTRACT

A distributed computing system includes a primary device and one or more backend devices. The primary device provides a management interface for the distributed computing system. A plurality of applications may be installed on the backend devices for execution. The primary device generates registration data that associates the applications with management interface commands or configuration parameters in response to messages received from the applications. Subsequently, when the primary device receives a particular command at the management interface, the primary device identifies, based on the registration data, a particular application from among the plurality of applications. In response to identifying the application, the primary device may send to the application an outgoing message.

19 Claims, 6 Drawing Sheets

(56) References Cited

U.S. PATENT DOCUMENTS

| | | | |
|---|---|---|---|
| 8,161,095 B2* | 4/2012 | Manion | H04L 45/00 |
| | | | 709/201 |
| 8,615,009 B1 | 12/2013 | Ramamoorthi et al. | |
| 9,021,010 B1 | 4/2015 | Das et al. | |
| 2002/0055968 A1* | 5/2002 | Wishoff | G06F 9/542 |
| | | | 709/203 |
| 2002/0069240 A1* | 6/2002 | Berk | H04L 29/12009 |
| | | | 709/203 |
| 2003/0050959 A1* | 3/2003 | Faybishenko | G06F 17/30867 |
| | | | 709/202 |
| 2003/0126195 A1* | 7/2003 | Reynolds | G06F 1/14 |
| | | | 709/203 |
| 2003/0208528 A1* | 11/2003 | Volkov | H04L 29/06 |
| | | | 709/203 |
| 2005/0015511 A1* | 1/2005 | Izmailov | H04L 12/18 |
| | | | 709/238 |
| 2006/0168136 A1* | 7/2006 | Bethlehem | H04L 63/102 |
| | | | 709/219 |
| 2008/0225860 A1* | 9/2008 | Manion | H04L 45/00 |
| | | | 370/395.31 |
| 2009/0276771 A1* | 11/2009 | Nickolov | G06F 9/4856 |
| | | | 717/177 |

\* cited by examiner

CONFIGURATION OF APPLICATIONS FOR DISTRIBUTED COMPUTING SYSTEMS

This application is a continuation of U.S. patent application Ser. No. 13/538,956, filed Jun. 29, 2012, the entire content of which is incorporated herein by reference.

BACKGROUND

Certain devices, referred to as routers, maintain tables of routing information that describe routes through the network. A "route" can generally be defined as a path between two locations on the network. Upon receiving an incoming data packet, the router examines destination information within the packet to identify the destination for the packet. Based on the destination, the router forwards the packet in accordance with a routing table.

Conventional routers typically include a mechanism, referred to herein as a management interface, for directly or remotely configuring the router. By interacting with the management interface, various clients, such as human users and automated scripts, can perform numerous configuration tasks. For example, the clients may configure interface cards of the router, adjust parameters for the supported network protocols, specify the physical components within the routing device, modify the routing information maintained by the router, access software modules and other resources residing on the router, and the like.

A distributed routing system is a system of devices (nodes) that together act as a single network router. Because distributed routing systems comprise multiple devices, distributed routing systems may be able to route larger volumes of network traffic than individual routing devices and may be able to provide more network services than individual routing devices. However, because distributed routing systems comprise multiple devices, distributed routing systems may be more difficult to configure than individual routing devices.

SUMMARY

In general, a distributed computing system is described that includes multiple devices, such as at least a first and a second device. Techniques are described that allow the distributed computing system and the multiple devices to be managed as a single managed entity. For example, the first device may be a primary device that provides a management interface to receive commands. Administrators and other devices may use the management interface to input commands to the distributed computing system and receive information from the distributed computing system. One or more applications may execute in an operating environment provided by the second device yet can be managed as if the applications were integrated components of the first device. For example, the first device may support a messaging scheme that allows the applications on the second device to output messages related to the configuration commands and configuration data supported by each application. In response to receiving the messages, the first device may generate registration data based on the messages. Subsequently, the first device may receive in the management interface a command or updated configuration data for which one of the applications has registered. In response, the first device may determine, based on the registration data, that one or more of the applications have registered an association with the command or configuration data. The first device may then, in response to identifying the application is associated with the command, send a message associated with the command or configuration data to the application.

In this way, the first device may operate as a central point of configuration and management for the application executing within the operating environment provided by the one or more additional devices of the distributed computing system. Moreover, the command syntax of the applications may be integrated within the management interface of the primary device in a manner that is seamless to the administrator. Further, a configuration database and rollback mechanisms provided by the first device may be utilized for centrally provisioning the applications. The entire configuration may, for example, be maintained within the central configuration database of the first device, and may be controlled by sophisticated commit and rollback features of the configuration database. The techniques may be used to pre-provision an application on another one of the devices of the distributed computing system even in situations where the application has not yet been deployed within the system.

This disclosure describes a method that comprises receiving, by a first device of a distributed computing system, an incoming message from an application running on a second device of the distributed computing system. The application performs a function of the distributed computing system. In addition, the method comprises generating, by the first device in response to receiving the incoming message, registration data based on the incoming message. Furthermore, the method comprises receiving, by the first device, a command in a management interface for the distributed computing system. The method also comprises, in response to receiving the command, identifying, by the first device and based on the registration data, the application from among a plurality of applications that run on one or more devices of the distributed computing system and that provide functions of the distributed computing system. In addition, the method comprises, in response to identifying the application, sending, by the first device, an outgoing message to the application.

This disclosure also describes a distributed computing system that routes flows of network traffic. The distributed computing system comprises a first device and a second device. The first device provides a management interface for the distributed computing system. The second device runs an application that performs one or more functions of the distributed computing system. The first device is configured to receive an incoming message from the application. The first device is also configured to generate, in response to receiving the incoming message, registration data based on the incoming message. In addition, the first device is configured to receive a command in a management interface for the distributed computing system. The first computing device is also configured to identify, based on the registration data and in response to receiving the command, the application from among a plurality of applications that run on one or more devices of the distributed computing system and that provide functions of the distributed computing system. Furthermore, the first computing device is configured to send, in response to identifying the application, an outgoing message to the application.

In addition, this disclosure describes a computer-readable storage medium that stores instructions that, when executed, cause a first device of a distributed computing system to receive an incoming message from the application. Execution of the instructions also causes the first device to generate, in response to receiving the incoming message, registration data based on the incoming message. In addition, execution of the instructions causes the first device to receive a command in a management interface for the distributed computing system. Furthermore, execution of the instructions causes the first device to identify, based on the registration data and in response to receiving the command, the application from among a plurality of applications that run on one or more devices of the distributed computing system and that provide functions of the distributed computing system. Execution of the instructions also causes the first device to send, in response to identifying the application, an outgoing message to the application.

One or more examples are set forth in the accompanying drawings and the description below. Other features, objects, and advantages will be apparent from the description and drawings, and from the claims.

DETAILED DESCRIPTION

The attached drawings illustrate examples. Elements indicated by reference numbers in the attached drawings correspond to elements indicated by like reference numbers in the following description. In the attached drawings, ellipses indicate the presence of one or more elements similar to those separated by the ellipses. Alphabetical suffixes on reference numbers for similar elements are not intended to indicate the presence of particular numbers of the elements. In this disclosure, elements having names that start with ordinal words (e.g., "first," "second," "third," and so on) do not necessarily imply that the elements have a particular order. Rather, such ordinal words are merely used to refer to different elements of a same or similar type.

Figure 1:
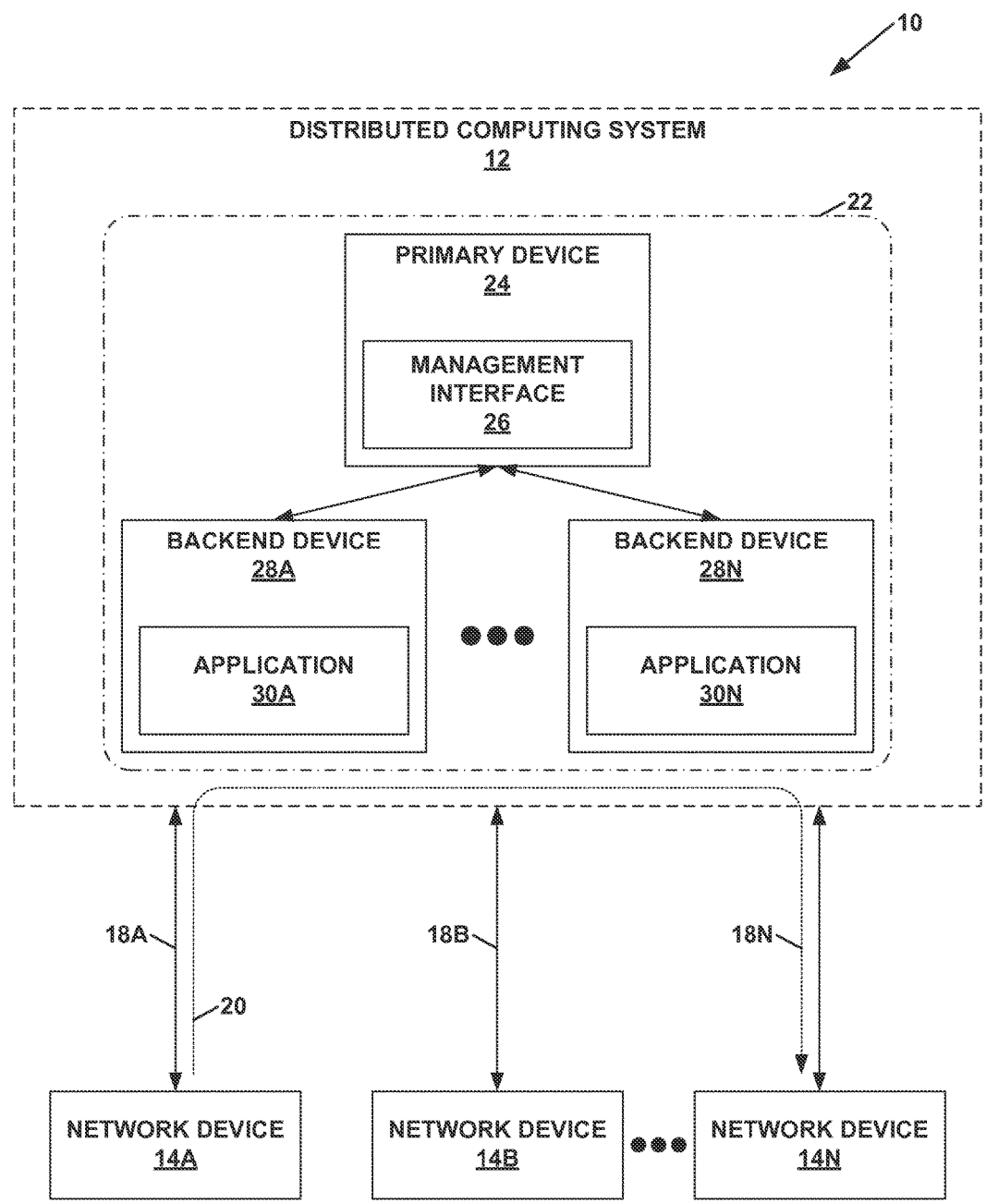
FIG. 1 is a block diagram that illustrates an example network system.

FIG. 1 is a block diagram illustrating an example network system 10. In this example, network system 10 comprises a distributed computing system 12 coupled to network devices 14A-14N (collectively, "network devices 14"). Other example network systems may include additional networks, network devices, and systems. Each of network devices 14 may be implemented as one or more computing devices capable of communicating with other computing devices of a network. Network devices 14 may include various types of computing devices. For example, network devices 14 may include personal computers, tablet computers, smart phones, game consoles, in-car computers, gaming devices, point-of-sale devices, routers, switches, hubs, server computers, supercomputers, mainframe computers, and other types of computing devices.

Connections 18A-18N (collectively, "connections 18") are links that communicatively couple network devices 14 to distributed computing system 12. In other words, network devices 14 can communicate with distributed computing system 12 via connections 18. Connections 18 may be implemented in various ways. For example, one or more of connections 18 may be implemented as an optical fiber, a coaxial cable, an RJ45 connector, or another type of optical or electrical communications medium. In other examples, one or more of connections 18 may include a communications network, such as the Internet, a wide area network, a local area network, and so on. In some examples, one or more of connections 18 may include wireless communication channels.

In some examples, distributed computing system 12 includes a distributed routing system. The following portions of this disclosure assume that distributed computing system 12 includes a distributed routing system. However, it will be understood that the techniques of this disclosure are not necessarily limited to distributed computing systems that include distributed routing systems. For example, distributed computing system 12 may include a cluster of computing devices that perform calculations for scientific or business purposes.

In examples where distributed computing system 12 is a distributed routing system, distributed computing system 12 may receive flows of network traffic from network devices 14. Such flows of network traffic may include packets, frames, cells, or other communication units. Each flow of network traffic originates at one of network devices 14 and is destined for a different one of network devices 14. Upon receiving data in a flow of network traffic, distributed computing system 12 may apply one or more services to the flow of network traffic. For example, distributed computing system 12 may determine how to forward the data in the flow of network traffic. In other words, distributed computing system 12 routes the flow of network traffic. For instance, in the example of FIG. 1, distributed computing system 12 receives a flow 20 of network traffic that originates at network device 14A. In this example, distributed computing system 12 may, upon receiving data in flow 20, make the determination to forward the data to network device 14N. In another example, upon receiving data in a flow of network traffic, distributed computing system 12 may scan the data for malware, such as computer viruses.

In this example, distributed computing system 12 includes a plurality of routing system devices 22, also referred to as nodes. Routing system devices 22 may communicate with each other via one or more communication channels. One or more of routing system devices 22 may receive flows of network traffic. The flows of network traffic may then be forwarded among routing system devices 22 before ultimately being output by one or more of routing system devices 22. Routing system devices 22 may include various types of computing devices or specialized hardware.

In the example of FIG. 1, the plurality of routing system devices 22 includes a primary device 24 that provides a management interface 26. Administrators and other devices may use the management interface to input commands to distributed computing system 12. For example, an administrator may use the management interface to input commands to configure various aspects of distributed computing system 12 or input commands to retrieve information about distributed computing system 12. In some examples, management interface 26 comprises a command line interface (CLI). In other examples, management interface 26 comprises a machine-machine interface. In such examples, management interface 26 may comprise a Network Configuration Protocol (NETCONF) interface, a desktop management interface (DMI) interface, or another type of interface for machine-machine communication.

Furthermore, in the example of FIG. 1, the plurality of routing system devices 22 includes one or more backend devices 28A-28N (collectively, "backend devices 28"). Backend devices 28 may also be referred to as "compute nodes" or "appliances." Backend devices 28 may perform various functions of distributed computing system 12. For example, one or more of backend devices 28 may perform malware detection services, intrusion detection services, denial of service attack detection services, network firewall services, traffic prioritization functions, media distribution services, and so on. In additional examples, backend devices 28 may provide services such as tunneling, virtual private networks, caching, application proxies, and content delivery network (CDN) services to incoming packets. Service providers may utilize backend devices 28 to provide content-specific services designed to improve the quality of a user's experience, for example, video streaming.

Applications 30A-30N (collectively, "applications 30") installed on backend devices 28 may configure or cause backend devices 28 to perform these functions. For example, an application installed on one of backend devices 28 may configure the backend device to perform malware detection functions. Each of applications 30 may be implemented as one or more software programs comprising sets of computer-executable instructions. In some examples, applications 30 may be developed by third parties, such as independent software development entities. Because applications 30 may be developed by third parties, the functionality of distributed computing system 12 may be extended and modified in ways that are useful to the particular party deploying distributed computing system 12. In some examples, applications 30 are developed using a software development kit (SDK). The example of FIG. 1 shows only a single application in each of backend devices 28. However, in other examples, one or more of backend devices 28 may include multiple applications or no applications. In some examples, applications 30 run in virtual machines on backend devices 28.

In this way, backend devices 28 may provide an operating environment for execution of applications 30. Backend devices 28 may be referred to as a services complex, and may include service cards, external blade servers, or one or more external servers built with off the-shelf-components, e.g., general purpose hardware. Backend devices 28 may be a local cluster of compute nodes that provide an operating environment for application software. As another example, routing system devices 22 may be intermediate network devices, personal computers, server computers, mainframe computers, or other types of computing devices. Further exemplary details of a routing device having internal and external service complex are described in U.S. patent application Ser. No. 12/765,636, entitled "INTERFACE FOR EXTENDING SERVICE CAP ABILITIES OF A NETWORK DEVICE," the entire contents of which are incorporated herein by reference.

In some cases, routing devices 22 may appear to other devices within network system 10 as a single device. For example, one of routing devices 22 (e.g., primary device 24) may provide control plane functionality that maintains peering sessions with neighbor routers. Primary device 24 may maintain a centralized routing information base (RIB), and may control forwarding of network traffic to each of backend devices 28. That is, primary device 24 may forward network traffic to backend devices 28 as necessary for application of services. In this way, routing system devices 22 may together act and appear as a single network device even when implemented as separate devices.

In some environments, backend devices 28 may or may not be operated by an entity that deploys distributed computing system 12. For example, distributed computing system 12 may be deployed by a telecommunication company and one or more of backend devices 28 may be operated by a computer security company. In some examples, backend devices 28 may be any computing devices that have Internet Protocol (IP) connectivity with primary device 24.

Each of applications 30 may have one or more aspects that an administrator can configure. These aspects may be referred to herein as "configuration knobs." For example, application 30A may perform network firewall functions. In this example, the configuration knobs of application 30A may enable an administrator to configure application 30A to block certain types of network traffic. Each configuration knob may be associated with one or more configuration parameters.

In accordance with the techniques of this disclosure, an administrator or computing device may input commands to management interface 26 in order to manage distributed computing system 12, including primary device 24 and backend devices 28, as a single entity. For example, primary device 24 supports a messaging scheme that allows applications 30 on backup backend devices 28 to output registration messages related to the particular configuration commands and configuration data supported by each application. In response to receiving the registration messages from applications 30, primary device 24 may generate registration data based on the registration messages.

For example, primary device 24 may receive an incoming registration message to associate one of applications 30 with a configuration parameter of distributed computing system 12. In this example, primary device 24 may generate registration data that indicates that the application is associated with the configuration parameter. In another example, primary device 24 may receive an incoming registration message to associate one of applications 30 with a command. In this example, primary device 24 may generate registration data that indicates that the application is associated with the command.

Subsequently, primary device 24 may receive a command in management interface 26. In response to receiving the command, primary device 24 may identify, based on the registration data, one of applications 30. Primary device 24 may then, in response to identifying the application, send an outgoing message to the application.

For example, primary device 24 may send to the application an outgoing message that instructs the application to perform the command. In another example, primary device 24 may receive a command at management interface 26. In response to receiving the command, primary device 24 may modify a copy of a configuration parameter stored at primary device 24. Subsequently, in this example, primary device 24 may receive another command at management interface 26. In response to receiving the other command, primary device 24 may identify, based on the registration data, an application associated with the configuration parameter. In response to identifying the application, primary device 24 may send to the application an outgoing message that instructs the application to synchronize a copy of the configuration parameter stored at a back end device with the copy of the configuration parameter stored at primary device 24.

In some embodiments, the respective command syntax for management of each of the applications may be integrated within management interface 26 of primary device 24 in a manner that is seamless to administrator. Moreover, primary device 24 may operate as a central point of configuration and management for applications 30 executing within the operating environment provided by backend devices 28. That is, for example, a configuration database and rollback mechanism provided by primary device 24 may be utilized for centrally provisioning applications 30. The entire configuration for primary device 24 as well as applications 30 may, for example, be maintained within the central configuration database of the primary device, and may be controlled by sophisticated commit and rollback features of the configuration database. Nevertheless, one or more applications 30 may be deployed within distributed computing system 12 in real-time, i.e., after distributed computing system 12 has been deployed within a network environment. This may allow third-party applications to be easily added and integrated within distributed computing system 12 at any time. Such third-party applications may execute within an operating environment provided by distributed computing system 12. The techniques described herein may be used to seamlessly integrate management of the configuration of any new application 30 into primary device 24. The techniques described herein may be utilized to pre-provision an application even in situations where the application has not yet been deployed within distributed computing system 12.

The techniques described herein may have certain advantages. For example, in conventional systems, an administrator would need to separately access applications 30 to configure applications 30 or retrieve information from applications 30. Separately accessing applications 30 may make it more difficult for the administrator to configure applications 30. This may increase the complexity of the configuration situation of distributed computing system 12 and may make it more difficult for the administrator to maintain distributed computing system 12. Moreover, separately accessing applications 30 may make it more difficult for the administrator to retrieve information from applications 30. Thus, the administrator may not be able to obtain a centralized view of the entire configuration of distributed computing system 12. The techniques of this disclosure may enable an administrator or a computing device to use a single management interface to configure applications 30 or retrieve information from applications 30. This may simplify the task of configuring applications 30 or retrieving information from applications 30.

Figure 2:
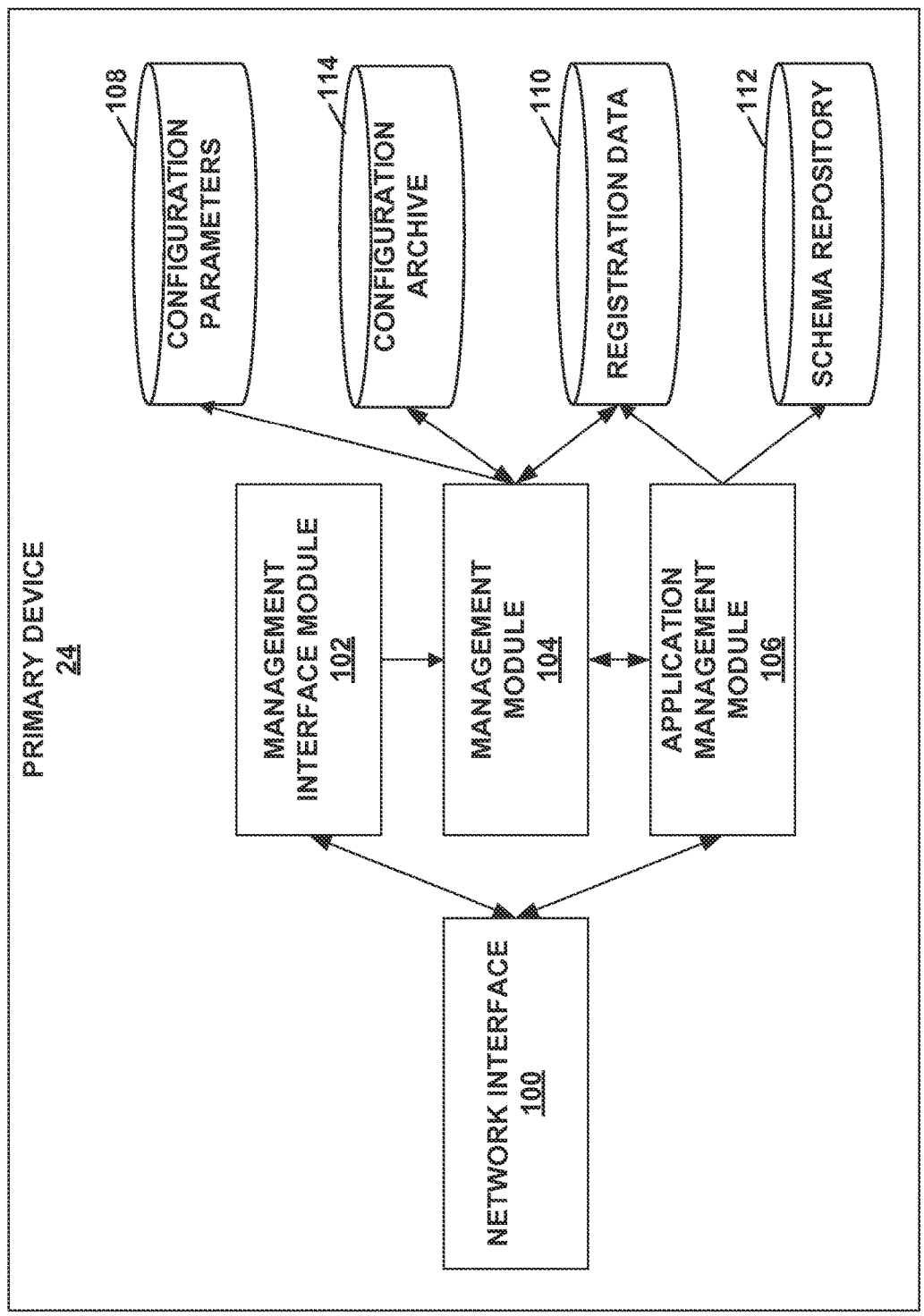
FIG. 2 is a block diagram that illustrates example details of a primary device of a distributed computing system.

FIG. 2 is a block diagram that illustrates example details of primary device 24. In the example of FIG. 2, primary device 24 comprises a network interface 100, a management interface module 102, a management module 104, an application management module 106, a set of configuration parameters 108 for distributed computing system 12, registration data 110, a schema repository 112, and a configuration archive 114. The example of FIG. 2 omits other components and data of primary device 24 for clarity.

Conceptually, distributed computing system 12 may comprise a forwarding plane and a control plane. The forwarding plane may handle the routine work of forwarding flows of network traffic. The control plane may control how the forwarding plane forwards the flows of network traffic. Management interface module 102, management module 104, and application management module 106 may operate at the control plane of distributed computing system 12. One or more of applications 30 may also operate at the control plane of distributed computing system 12.

Network interface 100 may enable primary device 24 to communicate with other computing devices over one or more communications networks. Network interface 100 may be implemented in various ways. For example, network interface 100 may include one or more Ethernet network interface cards (NICs). In another example, network interface 100 may include one or more optical NICs. In another example, network interface 100 may include one or more wireless transceivers.

Management interface module 102 may provide management interface 26. That is, management interface module 102 represents software configured to provide a management interface for locally or remotely configuring distributed computing system 12. By interacting with the management interface, various clients, such as human users and automated scripts, can perform configuration tasks. For example, the clients may configure interface cards of the device, adjust parameters for supported network protocols, specify physical components within the device, modify routing information maintained by primary device 24, access software modules and other resources residing on the distributed computing system 12, and perform other configuration tasks.

In some examples, management interface 26 displays a command prompt to an administrator. In such examples, an administrator may type a command at the command prompt and then press a button, such as "enter," to input the command to management interface 26. In other examples, management interface module 102 does not display a command prompt to an administrator. In such examples, management interface 26 may include a port or application programming interface (API) that receives text representing commands. Such examples may enable programs to enter commands to management interface 26. For example, management interface module 102 may represent a management interface capable of receiving text-based commands via the Simple Network Management Protocol (SNMP), which is a standard defined by the Internet Engineering Task Force (IETF) for managing network devices.

Management module 104 may provide management functions for primary device 24. Application management module 106 may act as an interface between management module 104 and applications 30 executing on backend devices 28 so as to seamlessly integrate the management and configuration of the applications via management interface 26. For instance, application management module 106 may act as a configuration server to receive and send messages related to the configuration of applications 30. For example, application management module 106 may receive registration messages from applications 30. In response to the registration messages, application management module 106 may generate or modify registration data 110 to associate applications 30 with various commands that may be received at management interface 26 or to associate applications 30 with various configuration parameters. For example, application 30A may implement a network firewall. In this example, application management module 106 may generate registration data 110 indicating that application 30A is associated with a command to change firewall settings. Application management module 106 is referred to as a "software development kit" management module in this example in that applications 30 may be developed by third parties utilizing an application. In some cases, new applications 30 may be deployed on distributed computing system 12 after distributed computing system 12 has been deployed within a network environment. Application management module 106 provides mechanisms by which such applications 30 may be integrated within distributed computing system 12 so that the components of primary device 24 may be utilized to centrally manage applications 30.

For example, application management module 106 may receive schema data from applications 30 or other sources. The schema data may indicate formats of messages that primary device 24 may send to applications 30. In response to receiving schema data, application management module 106 may store the schema data in schema repository 112. The schemas may be formatted in various ways. For example, the schemas may be formatted as extensible markup language (XML) schemas. In another example, the schemas may be formatted using the YANG data modeling language. Subsequently, when primary device 24 sends messages to applications 30, application management module 106 may format the messages according to the schemas provided by applications 30.

As mentioned above, management module 104 may perform various management functions. For example, management module 104 may perform various actions to respond to commands received at management interface 26 by management interface module 102. In this example, management module 104 may add configuration parameters to the set of configuration parameters 108 for distributed computing system 12 in response to commands received by management interface module 102. In another example, management module 104 may edit values of one or more of configuration parameters 108 in response to commands received by management interface module 102. In another example, management module 104 may delete one or more of configuration parameters 108 in response to commands received by management interface module 102. In another example, management module 104 may, in response to commands received by management interface module 102, instruct applications 30 to synchronize their copies of configuration parameters with copies of configuration parameters stored at primary device 24. Configuration parameters 108 may control various aspects of distributed computing system 12. When management module 104 changes, adds, or deletes a configuration parameter, management module 104 may identify, based on registration data 110, applications that have registered to support the parameters.

Configuration archive 114 may store past versions of configuration parameters 108. For example, configuration archive 114 may store the past fifty versions of configuration parameters 108. In the event that an administrator wants to return distributed computing system 12 to a past configuration, management module 104 may use stored past versions of the configuration parameters from configuration archive 114 to roll back changes to configuration parameters 108. In some examples, configuration archive 114 may also store past versions of schemas.

Management interface module 102, management module 104, and application management module 106 may be implemented in various ways. For example, management interface module 102, management module 104, and/or application management module 106 may be implemented as one or more software applications running on one or more processors of primary device 24. The example of FIG. 2 illustrates management interface module 102, management module 104, and application management module 106 as separate modules. However, in other examples, two or more of management interface module 102, management module 104, and application management module 106 may be implemented as a single module.

One or more computer-readable data storage media may store configuration parameters 108, registration data 110, schema repository 112, and configuration archive 114. Primary device 24 may store configuration parameters 108, registration data 110, schema repository 112, and configuration archive 114 in various ways, such as in relational databases, flat files, or other data structures.

In some instances, management module 104 may be referred to herein as a management daemon because management module 104 may (like a daemon) run as a background task, rather than being under the direct control of a human user. Similarly, application management module 106 may be referred to herein as a daemon because application management module 106 may run as a background task, rather than being under the direct control of a human user. In some instances, applications 30 or other programs running on backend devices 28 may also operate as daemons.

Figure 3:
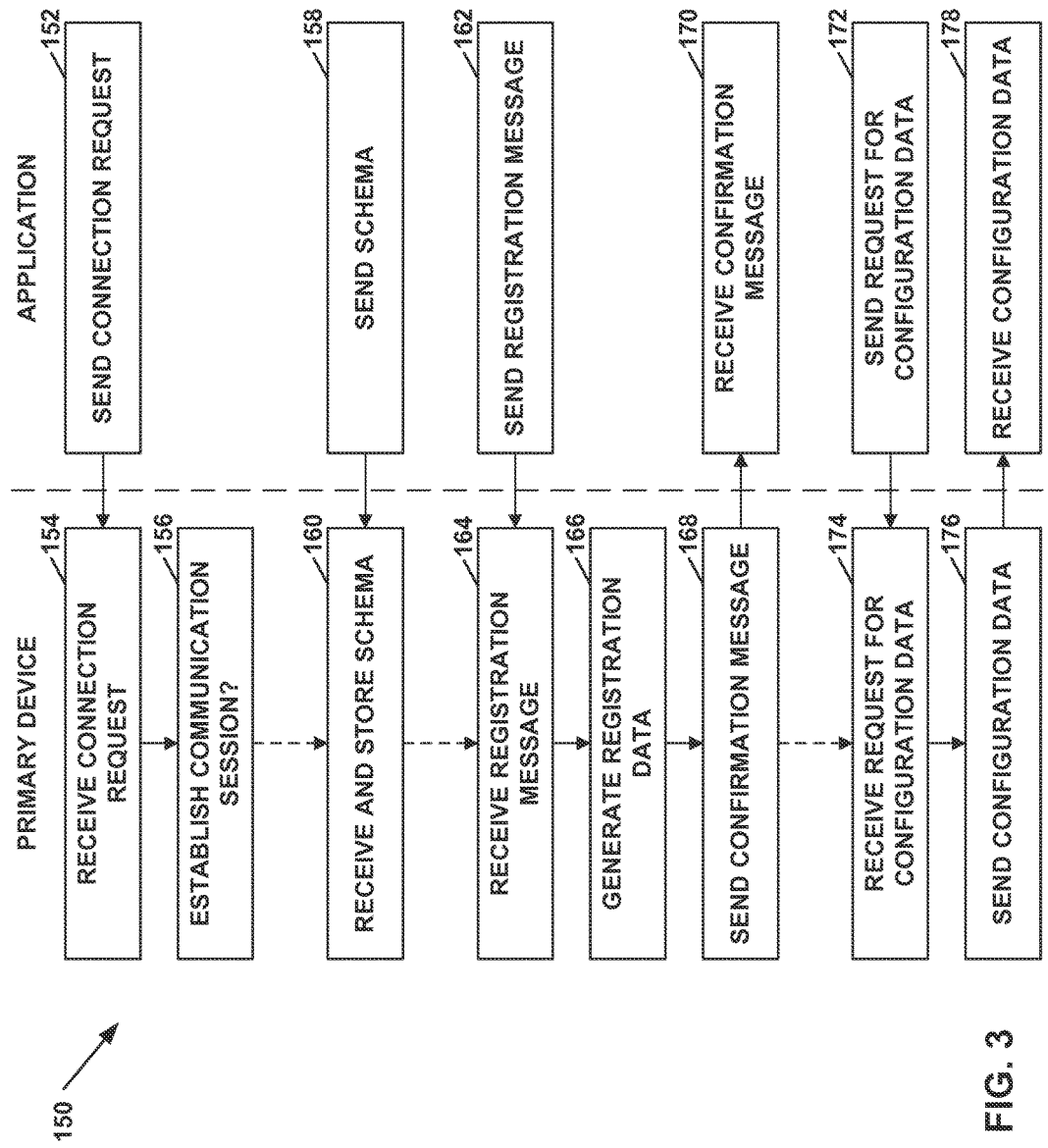
FIG. 3 is a flowchart that illustrates an example interaction between the primary device and an application.

FIG. 3 is a flowchart that illustrates an example interaction 150 between primary device 24 and an application. The application may be one of applications 30 (FIG. 1).

Initially, the application may send a connection request to primary device 24 (152). Primary device 24 may then receive the connection request (154). After primary device 24 receives the connection request, the application and primary device 24 may establish a communication session with each other (156). An administrator may configure the application to send the connection request to primary device 24. For example, the administrator may provide an IP address of primary device 24 to the application.

After the application and primary device 24 establish the communication session, the application may send a schema to primary device 24 (158). The schema may indicate a format for messages sent by primary device 24 to the application. The schema may express the format of the messages sent by primary device 24 using Output Definition Language (ODL). Furthermore, the schema may indicate syntax for one or more commands. The schema may express the syntax for commands using Data Definition Language (DDL).

When the application sends the schema, primary device 24 may receive and store the schema (160). Primary device 24 may store the schema in such a way that primary device 24 is able to retrieve the schema when primary device 24 sends messages to the application. In some examples, the schema may be in the form of a dynamic library that may be installed at primary device 24. In some examples, primary device 24 may store the schema in such a way that primary device 24 is able to retrieve the schema when primary device 24 receives a command whose format is specified by the schema.

The example of FIG. 3 shows the application sending the schema to primary device 24 over a network connection. However, in other examples, the schema can be provided to primary device 24 out of band. In other words, the schema may be provided to primary device 24 separately from the interaction of the application and primary device 24 shown in the example of FIG. 3.

Furthermore, the application may send a registration message to primary device 24 (162). The application may send the registration message and/or other messages to primary device 24 in various ways. For example, the application may use a particular communication protocol, such as Hypertext Transfer Protocol (HTTP) or a proprietary communication protocol, to send the registration message and/or other messages to primary device 24. In another example, the application may send the registration message and/or other messages to primary device 24 by communicating with primary device 24 to input one or more commands to management interface 26.

The example of FIG. 3 shows the application as sending the registration message to primary device 24. However, in other examples, other entities may send the registration message to primary device 24. For instance, an administrator of distributed computing system 12 may send the registration message to primary device 24.

The registration message may request primary device 24 to perform various actions. For example, the registration message may include a registration of the application in supporting one or more of configuration parameters 108. For instance, in this example, the registration message may include a registration of the application in supporting one or more configuration knobs, each of which may include one or more of configuration parameters 108. For example, the application may send a registration message that includes the message "RegisterCnfInterestReq["system virus-scanner"]" to indicate an interest in (i.e., register to support) the "system virus-scanner" parameter. In another example, configurations parameters may be organized into subtrees. In this example, the application may send a registration message that includes a registration for one or more of the subtrees. In this way, the application may register for each of the configuration parameters in the subtrees indicated by the registration message.

In another example, the registration message may include a registration by the application for handling a given command. For instance, the registration message may include a registration of the application for handling a "show" command that instructs distributed computing system 12 to show a particular type of information, such as information about the application. In some examples, the same application may register for handling multiple "show" commands so that the application can show various types of information. However, two different applications may be prohibited from registering for handling the same "show" command. For example, the application may send a registration message that include the message "RegisterCmdinterestReq["show virus-scanner", "level=detail"]" to register to support the "show virus-scanner" command when a level argument is equal to "detail."

In some examples, the application may be able to configure management interface 26 to accept a new command that is specific to the application. To do so, the application may send a registration message that includes a registration to support the new command.

When the application sends the registration message to primary device 24, primary device 24 may receive the registration message (164). In response to receiving the registration message, primary device 24 may generate registration data (166). In examples where the registration message instructs primary device 24 to associate the application with a command, the registration data may associate the application with the command. In examples where the registration message instructs primary device 24 to associate the application with a configuration parameter, the registration data may associate the application with the configuration parameter. In this way, the application may register to support a configuration parameter on demand.

The registration data may associate the application with the command in various ways. For example, the registration data may directly associate the application with the command. In this example, the registration data may indicate that when management interface 26 receives the command, the application is to execute some or all of the command.

In other examples, the registration data may indicate that the application has registered to support one or more of configuration parameters 108. In this example, the command may add or delete the configuration parameter or modify a value of the configuration parameter. In this example, when management interface 26 receives the command, primary device 24 may determine, based on the registration data indicating that the application has registered to support the configuration parameter, that the application is associated with the configuration parameter.

In some examples, the registration data may associate different applications with different variations of the same command. For example, a command received by management interface 26 may specify various arguments (e.g., parameters). In this example, the registration data may associate a first application with the command when the command specifies a first argument and may associate a second application with the command when the command specifies a second argument. In some examples, the registration data may associate different instances of the same application with different variations of the same command.

For example, primary device 24 may generate registration data that associates the application with a first variation of a command. In this example, primary device 24 may receive a registration message from a second application. Primary device 24 may generate, in response to receiving the registration message, registration data that associates the second application with a second variation of the command. Subsequently, primary device 24 may receive the second variation of the command in the management interface. Primary device 24 may determine, based on the registration data, that the second application is associated with the second variation of the command. Primary device 24 may send a message to the second application in response to determining that the second application is associated with the second variation of the command.

Furthermore, in response to receiving the registration message, primary device 24 may send a confirmation message to the application (168). The application may then receive the confirmation message (170). The confirmation message may confirm to the application that primary device 24 has associated the application with the command or configuration parameter. For example, the registration message may include a registration by the application to support a particular configuration parameter. In this example, the registration message may confirm that primary device 24 has associated the application with commands that create, change, or delete the particular configuration parameter. In this example, the confirmation message may indicate "RegisterCnfInterestRsp[0, "success"]" to indicate that the application successfully registered to support the particular configuration parameter. Similarly, if the registration message included a registration to handle a command, the confirmation message may indicate "RegisterCmdInterestRsp[0, "success"]".

Furthermore, the application may send a request for configuration data to primary device 24 (172). Primary device 24 may then receive the request for the configuration data (174). In response to the request for the configuration data, primary device 24 may send the configuration data to the application (176). The application may then receive the configuration data (178). In some examples, primary device 24 may send the configuration data to the application in an XML stream. In other words, the configuration data may be specified in XML. For example, the request for the configuration data may include "GetCnfReq["system chassis"]" to request configuration data regarding a system chassis. In this example, primary device 24 may send a message that includes "GetCnfRsp["success", "<chassis> . . . </chassis>"]. In this example, the information between the <chassis> tags includes the configuration data regarding the system chassis. In some examples, the message may indicate changes between (i.e., deltas) between a past value or state of the configuration parameter and a current value or state of the configuration parameter.

In this way, the application may retrieve configuration data, such as configuration parameters, relevant to the application from primary device 24. For example, the application may be able to retrieve configuration parameters relevant to particular configuration knobs of the application. In some examples, the application may be able to retrieve configuration data from primary device 24 on demand.

Figure 4:
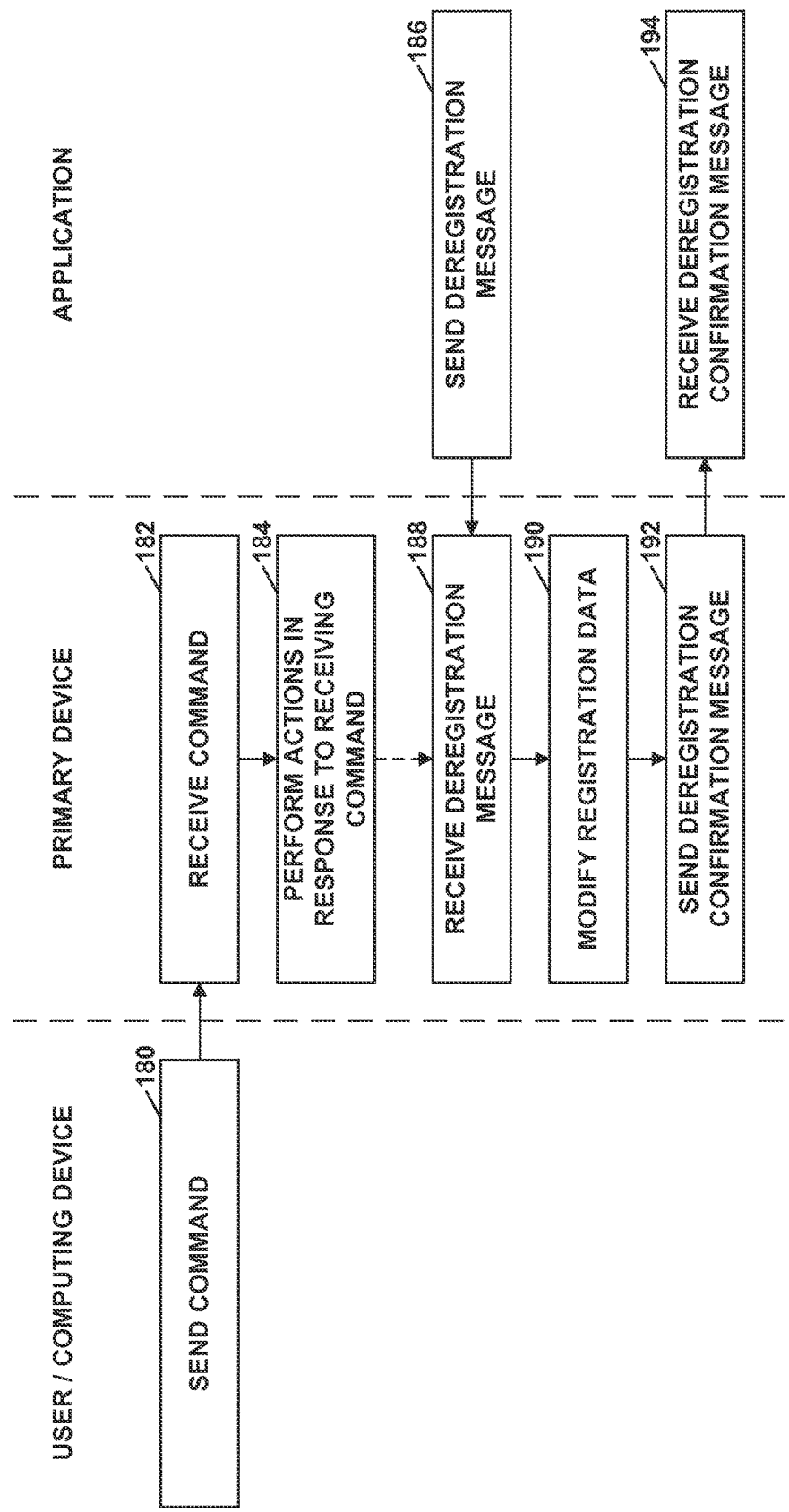
FIG. 4 is a flowchart that illustrates an example interaction between the primary device, the application, and an administrator.

FIG. 4 is flowchart that illustrates an example interaction between primary device 24, an application, and an administrator. The interaction shown in FIG. 4 may be a continuation of interaction 150 shown in the example of FIG. 3.

In the example of FIG. 4, an administrator or another computing device may send a command to management interface 26 of primary device 24 (180). Primary device 24 may then receive the command at management interface 26 (182). The administrator or other computing device may send the command to management interface 26 in various ways. For example, the administrator may open on a local computer a local management interface that emulates management interface 26. In this example, the local computer may communicate with primary device 24 such that the local computer sends commands entered in the local management interface to management interface 26. In this way, primary device 24 may receive text entry of a command from an administrator. Likewise, the local computer may communicate with primary device 24 such that the local management interface outputs information that would otherwise be output by management interface 26. In this example, the local computer and primary device 24 may communicate using a communication protocol such as Secure Shell (SSH) or Telnet.

In another example, primary device 24 may receive a command line interface (CLI) script that includes the command. The CLI script may include a series of commands to management interface 26. In some instances, the script may include conditional statements such that some of the commands in the script are provided to management interface 26 only when particular conditions are satisfied. After receiving the CLI script, primary device 24 may execute the CLI script. During execution of the CLI script, primary device 24 may receive commands in the CLI script at management interface 26.

In some examples, a command may include two parts: a command part and a list of zero or more name-value pairs of arguments. For instance, the command part of the command may indicate "show virus-scanner" to show data regarding a virus-scanner application of distributed computing system 12. Example name-value pairs may include "vm-instance=foo" and "level=detail," etc. Thus, commands for distributed computing system 12 to show data regarding the virus scanner may appear as:

cli> show virus-scanner,
  cli> show virus-scanner detail, or
  cli> show virus-scanner foo detail In some examples, the command may form part of a two-stage commit sequence. For example, management interface 26 may allow a client to modify the present configuration (configuration parameters 108) of primary device 24 using a commit-based model. In a commit-based model, a client issues one or more configuration commands, and then directs management interface 26 to apply the commands by issuing a "commit" command. Typically, the client may direct management interface 26 to disregard the commands by issuing a "rollback" command. For example, a client typically places primary device 24 in a configuration mode, often by issuing an edit command to the management interface 26. In this mode, management module 104 may essentially "lock" the configuration parameters of distributed computing system 12, and reject any configuration commands from other clients. In other examples, management module 104 does not lock the configuration parameters while in the configuration mode. Next, the client typically issues a number of commands directing management interface 26 to modify the present configuration, followed by a commit command that directs primary device 24 to apply the commands. Upon receiving the commit command, management module 104 exits the configuration mode, and applies the changes to the present configuration, thereby adjusting the operation of distributed computing system 12. Management module 102 may then exit the configuration mode. In some examples, management module 102 may effectively "unlock" the configuration of the distributed computing system when management module 102 exits the configuration mode and may allow configuration by other clients. In other examples, applications 30 may be prohibited from registering to handle commands that require two-stage commit sequences. Further example details of a router employing a commit-based model are described in U.S. patent application Ser. No. 11/561,748, entitled "GENERATION OF A CONFIGURATION PATCH FOR NETWORK DEVICES," the entire contents of which are incorporated herein by reference. In some examples, primary device 24 does not use a commit-based model for configuration statements.

Figure 5:
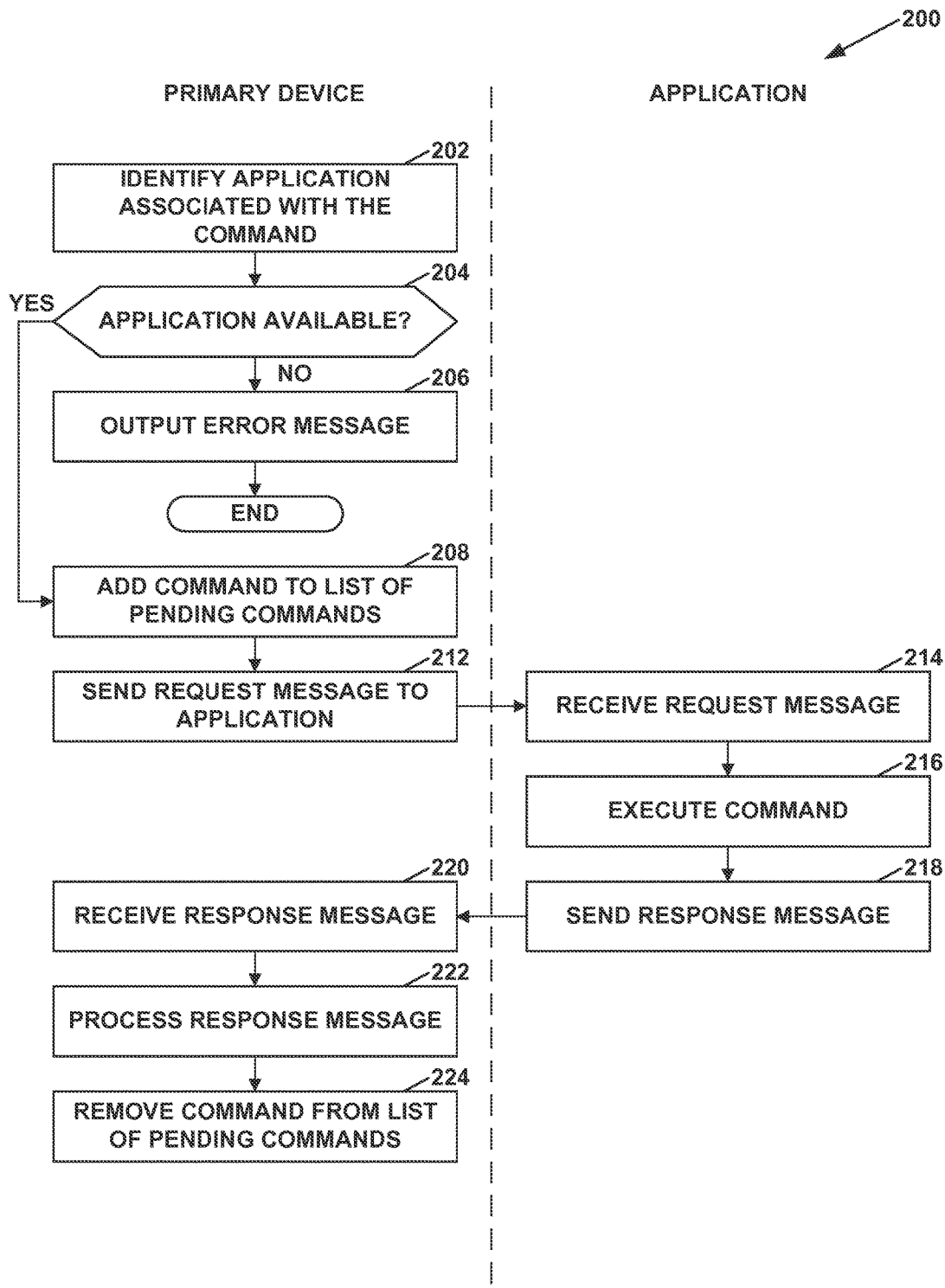
FIG. 5 is a flowchart that illustrates an example interaction performed by the primary device and the application in response to a command received at a management interface.
Figure 6:
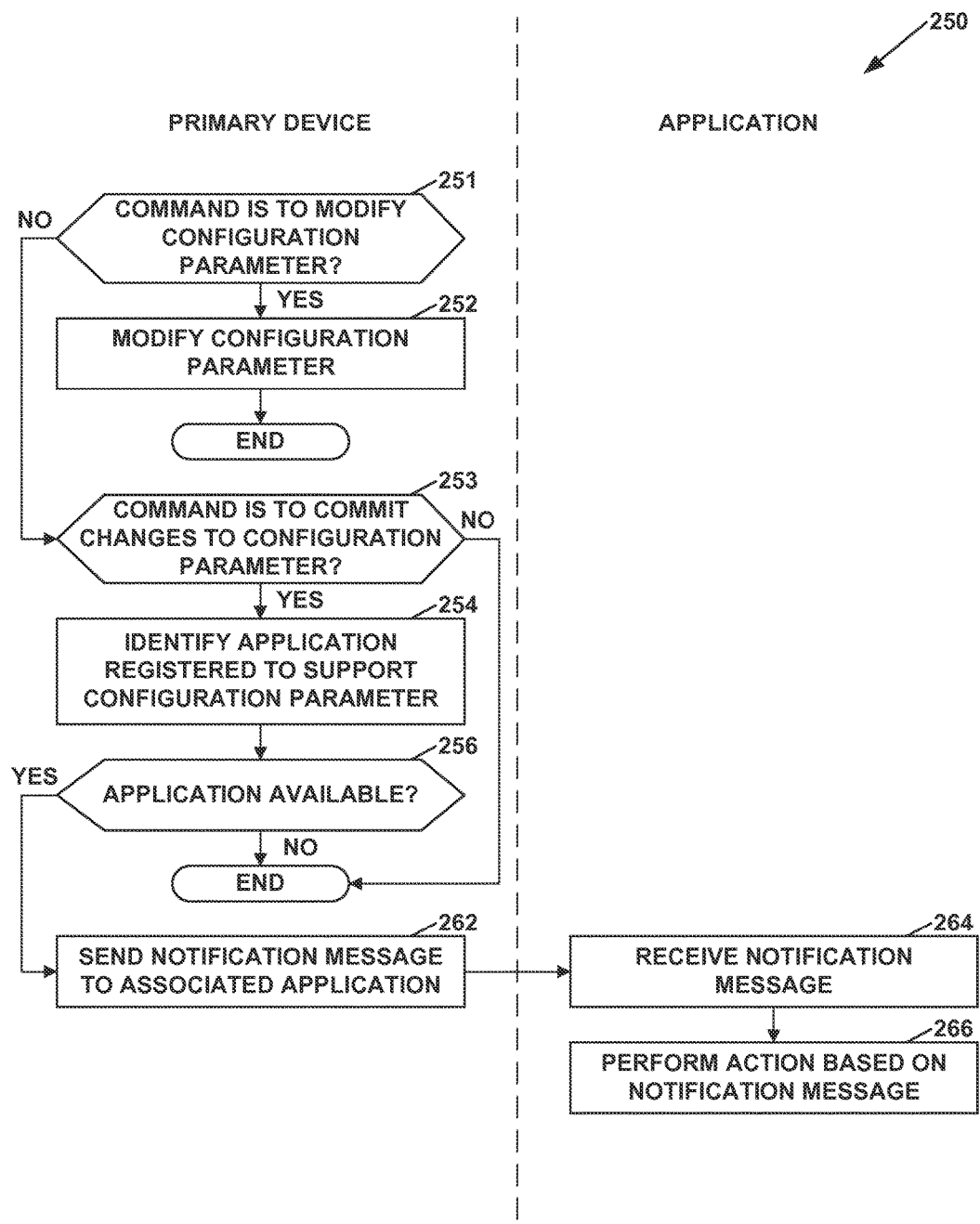
FIG. 6 is a flowchart that illustrates another example interaction performed by the primary device and the application in response to a command received at the management interface to modify one or more configuration parameters.

In any event, in response to receiving the command at management interface 26, primary device 24 may perform one or more actions in response to receiving the command (184). Primary device 24 may perform various actions in response to receiving the command. FIGS. 5 and 6, discussed below, are flowcharts that illustrate example interactions between primary device 24 and the application in respond to a command received at management interface 26.

In some examples, primary device 24 may retrieve a DDL schema from schema repository 112. Primary device 24 may then use the DDL schema to parse and validate the input of configuration statements and operational commands from the user.

Furthermore, in the example of FIG. 4, the application may send a deregistration message to primary device 24 (186). The deregistration message may indicate that the application no longer is to be associated with a particular command. For example, the deregistration message may indicate that the application is no longer to be associated with commands to modify a value of a configuration parameter or commands to add or delete a configuration parameter to the configuration parameters of distributed computing system 12. For example, the registration message may include "UnregisterCnfInterestReq["system virus-scanner"]" to deregister support for the "system virus-scanner" configuration parameter. Similarly, the deregistration message may include "UnregisterCmdInterestReq["show virus-scanner", "level=detail"]" to deregister from handling the "show virus-scanner" command when the "level" argument is equal to "detail."

After the application sends the deregistration message, primary device 24 may then receive the deregistration message (188). In response to receiving the deregistration message, primary device 24 may modify registration data 110 such that the application is no longer associated with a command or configuration parameter (190). In other words, primary device 24 may modify, in response to receiving the deregistration message, the registration data to disassociate the application and the command or configuration parameter.

After modifying registration data 110, primary device 24 may send a deregistration confirmation message to the application (192). Subsequently, the application may receive the deregistration confirmation message (194). The deregistration confirmation message may indicate that primary device 24 has deregistered the application from support a configuration parameter or handling a particular command. For instance, the deregistration message may include "UnregisterCnfInterestRsp["success"]" to indicate that primary device 24 has successfully deregistered the application from supporting a configuration parameter. In this way, the application may deregister support for a configuration parameter or command on demand. Similarly, the deregistration message may include "UnregisterCmdInterestRsp ["success"] to indicate that primary device 24 has successfully deregistered the application from handling a command.

FIG. 5 is a flowchart that illustrates an example interaction 200 between primary device 24 and an application in response to a command received at management interface 26. In interaction 200, a particular application has previously registered to support a particular command.

After interaction 200 starts, primary device 24 may identify, based on registration data 110, the particular application as being associated with the command (202). Primary device 24 may identify the particular application from among the applications that run on one or more devices of distributed computing system 12. For example, the particular application may be an anti-malware application. In this example, primary device 24 may search the registration data and determine that the registration data indicates that the application is associated with a command to update malware definitions.

In response to determining that the particular application is associated with the command, primary device 24 may determine whether the application is available (204). Primary device 24 may determine that an application is available if primary device 24 is able to communicate with the application. For example, primary device 24 may determine that an application is available if primary device 24 and the application have established a communication session.

In the example of FIG. 5, if primary device 24 determines that the application is not available ("NO" of 204), primary device 24 may output an error message to a user and perform no further action with regard to the command (206). In other examples, if the application is not available, primary 24 may wait to perform the remaining steps of interaction 200 until the application becomes available. In such examples, primary device 24 may perform other actions while waiting to perform the remaining steps of interaction 250.

If primary device 24 determines that the application is available ("YES" of 204), primary device 24 may add the command to a list of pending commands (208). Primary device 24 may add the command to the list of pending commands in order to keep a record of pending commands.

Next, primary device 24 may send an outgoing request message to the application (212). The application may then receive the request message (214). The request message may indicate the command received at management interface 26. For example, the command received at management interface 26 may instruct distributed computing system 12 to perform a particular action. In this example, the request message may instruct the application to perform the particular action. In this example, the request message may indicate "ExecuteCmdReq["show virus-scanner", "level=detail"]" to instruct the application to execute the "show virus-scanner" command with the "level" argument equal to "detail."

The request message may be formatted according to the schema for outgoing messages to the application. At different times, different applications may register to support the command. If these different applications are associated with different schemas, primary device 24 may send differently formatted request messages in response to receiving the same command.

In response to receiving the request message, the application may execute the command indicated by the request message (216). The application may perform various actions to execute the command. For example, the application may implement a network firewall. In this example, the command may instruct distributed computing system 12 to block flows of network traffic destined for a particular port of a particular destination address. In this example, the application may execute the command by modifying particular parameters in order to block such flows of network traffic.

After performing the command, or as part of performing the command, the application may send a response message to primary device 24 (218). Primary device 24 may then receive the response message (220). The response message may include various types of information. For example, the request message may instruct the application to perform a particular action. In this example, the response message may include output associated with the action. For instance, in this example, the request message may instruct the application to show information about the application. In this instance, the output associated with the action may include the information about the application. In some examples, the response message may include an XML stream. Thus, primary device 24 may receive information from the application in an XML stream. For example, if the request message instructed the application to execute the "show virus-scanner" command, the response message may include "ExecuteCmdRsp["success", "<tag>virus-count=2</tag>"]" to indicate that there are two viruses detected.

The example of FIG. 5 shows that the application may send a single response message in response to the command. In other examples, the application may send several messages in response to a single command. In other words, the application may send a series of response messages. Such messages may include different parts of the output associated with the command. Sending a series of response messages may be useful for large output. In such examples, primary device 24 and the application may implement flow control such that primary device 24 has the ability to request the application pause or resume the generation of messages. In some such examples, primary device 24 may request the application pause the generation of messages when a user requests a pause in output. Furthermore, in some such examples, primary device 24 may be able to request the application to abort a series of messages. In other words, primary device 24 may be able to request the application to stop sending output before a series of messages is complete. In some such examples, primary device 24 may request the application abort a series of messages when a user aborts the output.

Primary device 24 may process the response message in response to receiving the response message (222). Primary device 24 may process the response message in various ways. For example, the command received at management interface 26 may instruct the application to show information about the application and the response message may include the information about the application. In this example, primary device 24 may process the response message by outputting the information at management interface 26. For instance, in this example, the application may be a malware detection application and the command may instruct distributed computing system 12 to show malware detection statistics. In this instance, primary device may output the malware detection statistics at management interface 26.

In some examples, the response message from the application may include XML. In such examples, primary device 24 may use an ODL schema stored in schema repository 112 to parse the XML into human readable output.

After processing the response message, primary device 24 may remove the command from the list of pending commands (224). By removing the command from the list of pending commands, primary device 24 may be able to determine that primary device 24 is no longer waiting on another device to complete the command.

FIG. 6 is a flowchart that illustrates an example interaction 250 between primary device 24 and an application in response to a command received at management interface 26 to modify one or more configuration parameters. After primary device 24 starts interaction 250, primary device 24 may determine whether the command is a command to modify one or more configuration parameters of distributed computing system 12 (251). In response to determining that the command is to modify one or more configuration parameters of distributed computing system 12 ("YES" of 251), primary device 24 may modify the configuration parameters in accordance with the command (252). The configuration parameters may be among configuration parameters 108 (FIG. 2). Primary device 24 may modify the configuration parameters of distributed computing system 12 in various ways. For example, primary device 24 may modify the values of one or more of configuration parameters 108. In another example, primary device 24 may add one or more new configuration parameters to configuration parameters 108 of distributed computing system 12. After modifying the one or more configuration parameters, primary device 24 may wait to receive additional commands at management interface 26.

In some examples, primary device 24 may validate the configuration parameters prior to modifying the configuration parameters. Validation of the configuration parameters may ensure that the configuration parameters express a valid configuration state. In some such examples, a validation application may be installed on primary device 24 when an application is installed on distributed computing system 12. The validation application may validate configuration parameters associated with the application.

However, if the command is not to modify one or more configuration parameters, primary device 24 may determine whether the command is to commit a change made to a configuration parameter of distributed computing system 12 (253). If the command is not to commit changes made to a configuration parameter ("NO" of 253), primary device 24 may otherwise process the command and wait to receive additional commands at management interface 26.

If the command is to commit changes made to a configuration parameter of distributed computing system 12 ("YES" of 253), primary device 24 may identify, based on registration data 110, a particular application that has registered to support the configuration parameter (254). Primary device 24 may identify the particular application from among the applications that run on one or more of the devices of distributed computing system 12. For example, primary device 24 may determine, based on registration data 110, that application 30A (FIG. 1) has registered to support the configuration parameter. In some examples, primary device 24 may determine, based on registration data 110, that multiple applications running on backend devices 28 have registered to support the configuration parameter.

After determining that the particular application has registered to support the configuration parameter, primary device 24 may determine whether the application is available (256). Primary device 24 may determine that the application is available if primary device 24 is able to communicate with the application. For example, primary device 24 may determine that the application is available if primary device 24 and the application have established a communication session. In the example of FIG. 6, if primary device 24 determines that the application is not available ("NO" of 256), primary device 24 does not perform the remaining steps of interaction 250 (258). In other examples, primary device 24 may wait until the application becomes available before performing the remaining steps of interaction 250.

If primary device 24 determines that the application is available ("YES" of 256) or after the application becomes available in step 256, primary device 24 may send an outgoing notification message to the application (262). The application may then receive the notification message (264). In various circumstances, the notification message may include various types of data. For example, the notification message may indicate to the application that the configuration parameter has been changed. In this example, the notification message may instruct the application to synchronize a copy of the parameter at a backend device running the application with a copy of the parameter at primary device 24. In another example, the notification message may indicate that the configuration parameter has been added to or deleted from the configuration parameters of distributed computing system 12. If multiple applications have registered to support the configuration parameter, primary device 24 may send notifications messages to each of the applications that have registered to support the configuration parameter.

The notification message may be formatted according to the schema associated with the application. Different applications may be associated with different schemas. Hence, if different applications register to support the configuration parameter, primary device 24 may send differently formatted notification messages to the applications. For example, the notification message may include "CnfChangeNfy["system virus-scanner", ADDED]" to indicate that the "system virus-scanner" configuration parameter has been added. Similar notification messages may indicate that the "system virus-scanner" configuration parameters has changed or been deleted.

In some examples, the notification message may indicate changes between (i.e., deltas) between a past value or state of the configuration parameter and a current value or state of the configuration parameter. In other examples, the notification message may simply indicate the current value or state of the configuration parameter.

The particular application may perform an action based on the notification message after receiving the notification message (266). The application may perform various actions based on the notification message. For example, the application may maintain a local set of configuration parameters that control how the application operates. In this example, the notification message may indicate that the value of the configuration parameter has been modified. In response to receiving the notification message in this example, the application may send a message to primary device 24 requesting a current value of the configuration parameter as in step 158 of FIG. 3. In this example, when the application subsequently receives the current value of the configuration parameter, the application may modify the value of a corresponding configuration parameter in the local set of configuration parameters. As a result, the application may synchronize a copy of the configuration parameter at the back end device running the application with a copy of the configuration parameter at primary device 24. In this way, an administrator may control how the application operates by inputting a command at management interface 26.

As illustrated in the example of FIG. 6, primary device 24 may add, modify, or delete a configuration parameter and then wait for the application to become available before notifying the application about the change to the configuration parameter. This may be advantageous because it may allow an administrator to set configuration parameters in advance and then connect applications 30 and backend devices 28 to distributed computing system 12. In other words, the administrator may pre-provision configuration parameters 108, even when the backend device on which the application runs is not physically present.

It is to be recognized that depending on the embodiment, certain acts or events of any of the methods described herein may be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the methods, systems, and apparatuses disclosed herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Moreover, embodiments disclosed herein may be implemented or performed with an electronic device or circuit such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various examples have been described. These and other embodiments are within the scope of the following claims.

The invention claimed is:

1. A method comprising:
    receiving, by a first device of a distributed computing system, an incoming message from an application running on a second device of the distributed computing system, the application performing a function of the distributed computing system, the incoming message instructing the first device to associate the application with a configuration parameter of the distributed computing system;
    generating, by the first device in response to receiving the incoming message, registration data indicating that the application is associated with the configuration parameter;
    receiving, by the first device, a command in a management interface for the distributed computing system;
    in response to receiving the command, modifying, by the first device, a copy of the configuration parameter stored at the first device;
    identifying, by the first device and based on the registration data, the application as being associated with the command, wherein the first device identifies the application from among a plurality of applications that run on one or more devices of the distributed computing system and that provide functions of the distributed computing system;
    in response to identifying the application, determining, by the first device, whether the application is available; and
    in response to determining that the application is available or has become available, sending, by the first device, an outgoing message to the application, the outgoing message instructing the application to synchronize a copy of the configuration parameter stored at the second device with the copy of the configuration parameter stored at the first device.

2. The method of claim 1, wherein the command is a first command, the method further comprising:
    receiving a second command, the second command instructing the distributed computing system to perform an action;
    identifying, based on the registration data and in response to receiving the second command, the application as being associated with the second command;
    in response to identifying the application as being associated with the second command, send a second outgoing message, the second outgoing message instructing the application to perform the action; and
    receiving, at the first device, a response message from the application, the response message comprising output associated with the action.

3. The method of claim 2,
wherein the second command instructs the distributed computing system to show information about the application, and
wherein the output associated with the action comprises the information about the application.

4. The method of claim 3, wherein receiving the response message comprises receiving the information from the application in an XML stream.

5. The method of claim 2,
wherein the application is a first application and the incoming message is a first incoming message, and
the method further comprises:
generating registration data that associates the first application with a first variation of the second command;
receiving a second incoming message from a second application, the second application running on the second device or a third device of the distributed computing system;
generating, by the first device in response to receiving the second incoming message, registration data that associates the second application with a second variation of the second command;
receiving, at the first device, the second variation of the second command in the management interface;
determining, by the first device based on the registration data, that the second application is associated with the second variation of the second command; and
sending, by the first device, an outgoing message to the second application in response to determining that the second application is associated with the second variation of the second command.

6. The method of claim 1, wherein the outgoing message is a first outgoing message and the method further comprises sending, by the first device, a second outgoing message to the application in response to receiving the registration request, the second outgoing message confirming that the first device has associated the application with the configuration parameter.

7. The method of claim 1, further comprising:
receiving, at the first device, a deregistration message from the application; and
modifying, by the first device in response to receiving the deregistration message, the registration data to disassociate the application and the configuration parameter.

8. The method of claim 1, wherein the application provides network firewall, intrusion detection, or malware detection services.

9. The method of claim 1, further comprising:
receiving, by the first device, a command line interface (CLI) script that includes the command; and
executing, by the first device, the CLI script, wherein during execution of the CLI script the first device receives the command in the management interface.

10. The method of claim 1, wherein receiving the command comprises receiving text entry of the command from an administrator.

11. The method of claim 1, wherein the application is a third-party application executing within an operating environment provided by the distributed computing system.

12. The method of claim 1, further comprising:
receiving, at the first device, a schema associated with the application; and
formatting the outgoing message according to the schema.

13. The method of claim 1, further comprising:
determining, by the first device, whether the application is available;
if the application is available, adding, by the first device, the command to a list of pending commands; and
removing, by the first device, the command from the list of pending commands after processing a response message from the application.

14. A distributed computing system that routes flows of network traffic, the distributed computing system comprising:
a first device and a second device, the first device providing a management interface for the distributed computing system, the second device running an application that performs one or more functions of the distributed computing system,
wherein the first device is configured to:
receive an incoming message from the application, the incoming message instructing the first device to associate the application with a configuration parameter of the distributed computing system;
generate, in response to receiving the incoming message, registration data indicating that the application is associated with the configuration parameter;
receive a command in a management interface for the distributed computing system;
in response to receiving the command, modify a copy of the configuration parameter stored at the first device;
identify, based on the registration data, the application as being associated with the command, wherein the first device identifies the application from among a plurality of applications that run on one or more devices of the distributed computing system and that provide functions of the distributed computing system;
in response to identifying the application, determine whether the application is available; and
in response determining that the application is available or has become available, send an outgoing message to the application, the outgoing message instructing the application to synchronize a copy of the configuration parameter stored at the second device with the copy of the configuration parameter stored at the first device.

15. The distributed computing system of claim 14, wherein:
the command is a first command, and
the first device is configured to:
receive a second command, the second command instructing the distributed computing system to perform an action;
identify, based on the registration data and in response to receiving the second command, the application as being associated with the second command;
in response to identifying the application as being associated with the second command, send a second outgoing message, the second outgoing message instructing the application to perform the action; and
receive a response message from the application, the response message comprising output associated with the action.

16. The distributed computing system of claim 14, wherein the command is a first command, and the first device is configured to:
receive a second command, the second command instructing the distributed computing system to add the configuration parameter; and output a second outgoing message to the application, the second outgoing message indicating that the given configuration parameter has been added.

17. The distributed computing system of claim 14, wherein the application is a third party application.

18. The distributed computing system of claim 14, wherein the first device is further configured to:
   determine whether the application is available;
   if the application is available, add the command to a list of pending commands; and
   remove the command from the list of pending commands after processing a response message from the application.

19. A non-transitory computer-readable storage medium that stores instructions that, when executed, cause a first device of a distributed computing system to:
   receive an incoming message from an application, the incoming message instructing the first device to associate the application with a configuration parameter of the distributed computing system;
   generate, in response to receiving the incoming message, registration data indicating that the application is associated with the configuration parameter;
   receive a command in a management interface for the distributed computing system;
   in response to receiving the command, modifying a copy of the configuration parameter stored at the first device;
   identify, based on the registration data, the application as being associated with the command, wherein the first device identifies the application from among a plurality of applications that run on one or more devices of the distributed computing system and that provide functions of the distributed computing system;
   in response to identifying the application, determine whether the application is available; and
   in response to determining that the application is available or has become available, send an outgoing message to the application, the outgoing message instructing the application to synchronize a copy of the configuration parameter stored at the second device with the copy of the configuration parameter stored at the first device.

* * * * *